United States Patent
Gebhardt et al.

(10) Patent No.: US 6,576,358 B2
(45) Date of Patent: Jun. 10, 2003

(54) METHOD OF DISCHARGING REACTION WATER IN PEM FUEL CELLS AND FUEL CELL FOR CARRYING OUT THE METHOD

(75) Inventors: Ulrich Gebhardt, Langensendelbach (DE); Rainer Leuschner, Grossenseebach (DE); Matthias Lipinski, Erlangen (DE); Manfred Waidhas, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 231 days.

(21) Appl. No.: 09/822,018

(22) Filed: Mar. 30, 2001

(65) Prior Publication Data

US 2001/0038933 A1 Nov. 8, 2001

Related U.S. Application Data

(63) Continuation of application No. PCT/DE99/02987, filed on Sep. 17, 1999.

(30) Foreign Application Priority Data

Sep. 30, 1998 (DE) .......................................... 198 44 983

(51) Int. Cl.[7] ................................................. H01M 8/04
(52) U.S. Cl. ........................................... 429/13; 429/38
(58) Field of Search ..................................... 429/13, 38

(56) References Cited

U.S. PATENT DOCUMENTS

| | | |
|---|---|---|
| 5,260,143 A | 11/1993 | Voss et al. |
| 5,272,017 A | 12/1993 | Swathirajan et al. |
| 5,350,643 A | 9/1994 | Imahashi et al. |
| 5,366,818 A | 11/1994 | Wilkinson et al. |
| 6,030,718 A * | 2/2000 | Fuglevand et al. ........... 429/26 |

FOREIGN PATENT DOCUMENTS

| | | |
|---|---|---|
| EP | 0 569 062 A2 | 11/1993 |
| EP | 700108 A2 * | 3/1996 |
| EP | 0 567 499 B1 | 5/1997 |
| EP | 0 867 963 A2 | 9/1998 |
| EP | 0 917 226 A2 | 5/1999 |

OTHER PUBLICATIONS

International Publication No. WO 98/39809 (Koschany et al.), dated Sep. 11, 1998.

International Publication No. WO 96/31913 (Hammerschmidt et al.), dated Oct. 10, 1996.

"PEM Fuel Cells for Energy Storage Systems" (Strasser), Proceedings of the 26th Intersociety Energy Conversion Eng. Conference, Boston MA, Aug. 1991, vol. 3., pp. 630–635.

* cited by examiner

*Primary Examiner*—Carol Chaney
*Assistant Examiner*—Susy Tsang-Foster
(74) *Attorney, Agent, or Firm*—Laurence A. Greenberg; Werner H. Stemer; Gregory L. Mayback

(57) ABSTRACT

Discharging the reaction water from the novel PEM fuel cells does not require humidification of the reaction gases or an increase in the gas pressure. This is attained in that a hydrophobic layer on the cathode side is used which has a smaller pore size than the layer on the anode side. The reaction water is removed via the anode during the operation of the fuel cell.

7 Claims, No Drawings

METHOD OF DISCHARGING REACTION WATER IN PEM FUEL CELLS AND FUEL CELL FOR CARRYING OUT THE METHOD

CROSS-REFERENCE TO RELATED APPLICATION

This is a continuation of International application No. PCT/DE99/02987, filed Sep. 17, 1999 which designated the United States.

BACKGROUND OF THE INVENTION

1. Field of the Invention

The invention lies in the technological field of PEM fuel cells and pertains, more specifically, to a method for discharging reaction water in PEM fuel cells and to a PEM fuel cell for implementing the method.

The operation of fuel cells gives rise—in the course of the electrochemical reaction of hydrogen ($H_2$) with oxygen ($O_2$)—to water ($H_2O$). In PEM fuel cells (PEM=polymer electrolyte membrane), in which a cation exchange membrane serves as the electrolyte, the protons ($H^+$) formed at the anode—via oxidation of the hydrogen—diffuse through the membrane and at the cathode combine with the $O^{2-}$ ions produced there to form water. The reaction water must be removed from the fuel cell so as not to affect the water budget and to keep it constant.

Various options of discharging the reaction water from PEM fuel cells are known:

Discharge from the cathode side (in liquid phase):
The reaction gases are humidified to completion (saturation concentration) at the operating temperature, e.g. about 60 to 80° C. The reaction water is then produced as a liquid and is carried off in the transport gas, from the cathode gas space by means of a gas excess (see Proceedings of the 26th Intersoc. Energy Conversion Eng. Conf., Boston, Mass., Aug. 4 to 9, 1991, Vol. 3, pp. 630–35; the publication also discloses the design principles for a PEM fuel cell).
If the cell is operated with air, the transport gas can be the inert gas fraction nitrogen ($N_2$). A drawback of that process is that the humidification of the reaction gases is relatively involved.

Discharge on the cathode side (partially or completely in vapor phase):
The reaction gases are not humidified or only partially humidified, so that the reaction water can be discharged, at least in part, as a vapor (see U.S. Pat. No. 5,260,143 and European patent EP 0 567 499 B1). That type of operational approach places certain requirements on the electrolyte membrane in terms of mechanical stability and conductivity. In systems employing elevated working pressures it is possible to convert the reaction water into the vapor phase via expansion stages and to remove it from the fuel cell. Such a procedure is very involved however.

Discharge on the anode side:
The operational approaches in which the reaction water is discharged on the anode side employ a pressure differential—of the reactants—between cathode and anode (see U.S. Pat. No. 5,366,818). There, elevated gas pressure on the cathode side, e.g. air at $4 \cdot 10^5$ Pa (4 bar) compared with hydrogen at $2 \cdot 10^5$ Pa (2 bar), is employed to force the reaction water to the anode side where it is removed from the fuel cell by means of excess hydrogen. Setting an elevated pressure (on the cathode side) has severe drawbacks, however, since compression requires energy.

Furthermore, U.S. Pat. No. 5,272,017 and published European patent application EP 0 569 062 describe an "MEA" (Membrane Electrode Assembly) for use in a PEM fuel cell, in which two catalytically active, cathode- and anode-side layers are applied as electrodes to a polymer electrolyte membrane.

These layers consist of finely disperse carbon powder in which catalyst particles are present. On the anode side, the particles should have a pore size of from 9 to 11 nm, while a pore size of 6 to 8 nm obtains on the cathode side.

SUMMARY OF THE INVENTION

The object of the present invention is to provide a method of discharging reaction water from fuel cells and a fuel cell for carrying out the method, which overcome the above-noted deficiencies and disadvantages of the prior art devices and methods of this general kind, and which implements the discharge of reaction water in PEM fuel cells—comprising one porous layer each disposed on the cathode and on the anode—in such a way that neither humidification of the reaction gases nor elevated gas pressures are required.

With the above and other objects in view there is provided, in accordance with the invention, a method of discharging reaction water in a PEM fuel cell comprising an electrolyte membrane disposed between an anode and a cathode, the method which comprises placing one porous layer each on the cathode and on the anode and thereby forming a hydrophobic layer on the cathode having a smaller pore size than the porous layer on the anode, and discharging reaction water through the anode.

In other words, the objects of the invention are satisfied by the hydrophobic layer on the cathode side which has a smaller pore size than the anode-side layer and by the reaction water being discharged through the anode.

The invention therefore consists in discharging the reaction water on the anode side, with the advantage that gas humidification can be dispensed with and no elevated pressure is required, the invention providing a "gas conduction layer" on the cathode side. This gas conduction layer is gas-permeable, but impermeable to liquid water. Since during operation of the fuel cell—depending on the load—water is being formed continuously as a liquid, the internal pressure in the cell on the cathode side increases and the water is forced through the electrolyte membrane to the anode—and through the anode—whence it is removed by means of an excess reactant gas stream, i.e. is transported from the fuel cell. Humidification of the reaction gas on the anode side need not be ruled out as a matter of principle however. This is the case, for example, if the reaction gas which carries off the water is recirculated.

The inventive approach offers the following advantages:
The cathode gas (oxidant), namely air or oxygen, need not be humidified, i.e. it can be supplied to the fuel cell in dry form without the electrolyte membrane becoming desiccated and damaged.
The anode gas, namely hydrogen, likewise need not be humidified, since all of the reaction water is transported to the anode and there ensures adequate humidity. Desiccation during operation cannot occur therefore.
The problems which arise in controlling the water budget in PEM fuel cells on the cathode side are overcome with the method according to the invention, in that the discharge of water takes place systematically on the anode side. This means that it is not possible for water droplets in the porous gas conduction layer on the cathode to give rise to inert gas blankets ($N_2$) which inhibit the diffusion of the oxygen toward the catalyst layer.

The effective pressure increase is achieved by means of an internal barrier layer. This means that the system works independently of the reaction pressures. No differential pressure is required which has to be achieved externally, e.g. via an air compressor.

With the above and other objects in view there is also provided, in accordance with a further feature of the invention, a PEM fuel cell for performing the above-noted method. The PEM fuel cell comprises an anode, a cathode, an electrolyte membrane between the anode and the cathode, a first porous, electron-conducting layer disposed on the anode and a second porous, electron-conducting layer disposed on the cathode. The second layer on the cathode side is hydrophobic and has, at least on a surface thereof, a smaller pore size than the first layer on the anode side.

In other words, the apparatus for implementing the method according to the invention, i.e. a fuel cell, includes—in addition to an anode, a cathode, and an electrolyte membrane (between anode and cathode)—one porous, electron-conducting layer each disposed on the anode and on the cathode, the layer on the cathode side (gas conduction layer) being hydrophobic and having, at least on the surface, a smaller pore size than the layer on the anode side. Thus the gas conduction layer forms a barrier to liquid water.

The gas conduction layer preferably has a smaller pore size, in the surface adjoining the cathode, than the layer on the anode side. Such an embodiment can be implemented for example by means of a gas conduction layer having an asymmetric pore structure. This has the advantage that the delivery of the reaction gas to the cathode is impeded to a relatively minor extent, this being important, in particular, if the cell is operated with air.

The gas conduction layer can be present as a uniform layer having the specific pore size. Alternatively, however, it can consist of a sequence of layers such that a thin barrier layer, i.e. a layer having the specific pore size, is disposed between the electron-conducting layer present in fuel cells and the cathode. Such a design likewise has the advantage—in addition to being readily implementable—of only minor retardation of the delivery of the reaction gas.

In accordance with an added feature of the invention, therefore, the second layer on the cathode side has a smaller pore size, in the surface adjoining the cathode, than the first layer on the anode.

In accordance with an additional feature of the invention, the second layer, i.e., the gas conduction layer on the cathode is formed of an aerogel or a xerogel comprising carbon. Such layers, which are electron-conducting, can be produced in a relatively simple manner with the specific pore size required to prevent the passage of water.

Carbon aerogels or xerogels are known per se (cf. DE 195 23 382 A1); they are prepared e.g. by pyrolysis of aerogels based on organic compounds. The aerogels or xerogels used, in particular, are those based on resorcinol and formaldehyde (as monomers). Apart from resorcinol (1,3-dihydroxybenzene), other phenolic compounds can also be used however, e.g. phenol itself and the other dihydroxybenzenes, i.e. pyrocatechol and hydroquinone, and trihydroxy-benzenes such as pyrogallol and phloroglucinol, and also bisphenol A. The phenolic ring can also carry further substituents, e.g. alkyl groups, substituted alkyl groups, such as —$CH_2OH$, and carboxyl groups, i.e. compounds such as alkyl phenols and dihydroxybenzoic acids can be used, for example. Instead of the phenolic components, compounds such as melamine can be used as an alternative. Furthermore, the formaldehyde can be replaced by other aldehydes, e.g. by furfural ($\alpha$-furfurylaldehyde).

In accordance with another feature of the invention, the second layer has a support matrix, i.e., the aerogel or xerogel layer advantageously includes a matrix, the mechanical stability of the relatively thin layer thus being enhanced. The matrix preferably consists—at least in part—of organic material. Potentially suitable for this purpose are, in particular, cellulose, polyamides, polyesters and phenolic resins, especially Novolaks. The organic material can be in the form of porous membranes and flexible fiber webs and fibrous tissues. Alternatively, however, the matrix can consist of inorganic material, especially carbon fibers, aluminum oxide fibers, zirconium dioxide fibers or silicon dioxide fibers.

Alternatively, the gas conduction layer can consist of a carbon paper or carbon fabric whose cathode-side surface is hydrophobic, i.e. acts as a barrier to liquid, and which has a specific pore size. For this purpose, the surface can, for example, have a fine powder of carbon black, which is electron-conducting, and/or poly(tetrafluorethylene) (PTFE) incorporated thereinto.

In accordance with a concomitant feature of the invention, the first layer on the anode consists of porous carbon paper or carbon fabric employed customarily in PEM fuel cells. This layer, which can likewise be hydrophobic, generally has—like the gas conduction layer—a layer thickness of from 100 to 300 $\mu$m. As a matter of principle, these layers should be as thin as possible while still being capable of being handled mechanically.

Other features which are considered as characteristic for the invention are set forth in the appended claims.

Although the invention is described herein as embodied in a method of discharging reaction water in PEM fuel cells and a corresponding fuel cell, it is nevertheless not intended to be limited to the details given, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments and examples.

DESCRIPTION OF THE PREFERRED EMBODIMENTS AND EXAMPLES

To prepare a gas conduction layer, 10 g of a 40% formaldehyde solution are mixed with 7.3 g resorcinol, followed by the addition of 0.9 g of a 0.1 N sodium carbonate solution and 20 g of water. This solution is used to impregnate a cellulose membrane which is then—according to the sandwich principle—placed between two plane-parallel glass plates and stored in a sealed container at room temperature for about 24 h with the exclusion of air, the glass plates being subjected by suitable means, e.g. by means of springs, to a compression pressure set to about 50 bar ($5 \cdot 10^6$ Pa). After further storage over a period of about 24 h at about 50° C., gelling of the specimen occurs. The specimen is then left to age for about 24 h at a temperature of about 90° C., and the pore fluid, i.e. the water, is replaced by acetone. Then, the specimen is subcritically dried at a temperature of about 50° C. The fluid that is present in the pores evaporates in the drying process; this affords a xerogel. If the specimen after aging is dried supercritically with carbon dioxide in an autoclave, an aerogel is obtained. Subsequently, the dried specimen is pyrolyzed at about 1050° C. in an argon atmosphere containing 5% methane (duration: about 2 h).

The specimens thus prepared already have the required hydrophobic characteristics. If additional hydrophobicization is desirable or necessary, this can be effected e.g. by means of a PTFE (polytetrafluoroethylene) solution, with which the specimens are impregnated.

This affords mechanically stable hydrophobic gas conduction layers in the form of a carbon aerogel or carbon xerogel/cellulose membrane composite. The surface of this composite, whose pore size is $\leq 10$ μm (minimum size: about 500 nm), is covered with a smooth skin which has a thickness from about 3 to 4 μm and a pore size $\leq 30$ nm (resolution limit of the scanning electron microscope used for the test). The thickness of the film, which is generally from 1 to 5 μm, can be adjusted via the compression pressure during gelling. The pressure is between about 20 and 100 mbar ($2–10 \cdot 10^3$ Pa).

One embodiment of a fuel cell (active electrode area: 3 cm$^2$) for implementing the method according to the invention is configured as follows: Disposed between an anode unit and a cathode unit is a commercial Nafion membrane. The anode unit consists of a carbon paper which is provided with a platinum catalyst. The cathode unit consists of a hydrophobic microporous aerogel layer or xerogel layer which is prepared in the above-described manner and onto which a platinum catalyst is applied.

This fuel cell was operated as an $H_2/O_2$ cell using dry reaction gases, at a temperature of about 80° C. On the cathode side, the cell was periodically flushed, depending on the purity of the oxygen used. The reaction water was flushed out on the anode side by a hydrogen stream ($\lambda \geq 2$). These conditions permitted trouble-free operation of the fuel cell at a constant load of about 400 mA/cm$^2$, with a cell voltage of about 720 mV.

We claim:

1. A method of discharging reaction water in a PEM fuel cell comprising an electrolyte membrane disposed between an anode and a cathode, the method which comprises placing one porous layer each on the cathode and on the anode and thereby forming a hydrophobic layer on the cathode having a smaller pore size than the porous layer on the anode, and discharging reaction water through the anode.

2. A PEM fuel cell, comprising an anode, a cathode, an electrolyte membrane between said anode and said cathode, a first porous, electron-conducting layer disposed on said anode and a second porous, electron-conducting layer disposed on said cathode, said second layer on said cathode being hydrophobic and having, at least on a surface thereof, a smaller pore size than said first layer on said anode.

3. The PEM fuel cell according to claim 2, wherein said second layer on said cathode side has a smaller pore size, in the surface adjoining said cathode, than said first layer on said anode.

4. The PEM fuel cell according to claim 2, wherein said second layer on said cathode is formed of a material selected from the group consisting of an aerogel and a xerogel comprising carbon.

5. The PEM fuel cell according to claim 4, wherein said second layer includes a support matrix.

6. The PEM fuel cell according to claim 2, wherein said first layer on said anode consists of porous carbon paper.

7. A method of operating a PEM fuel cell, which comprises providing a fuel cell according to claim 2, and discharging reaction water through the anode during an operation of the fuel cell.

* * * * *